US010109069B2

(12) United States Patent
Chatterjee et al.

(10) Patent No.: US 10,109,069 B2
(45) Date of Patent: Oct. 23, 2018

(54) ANGLE-DEPENDENT ANISOTROPIC FILTERING

(71) Applicant: INTEL CORPORATION, Santa Clara, CA (US)

(72) Inventors: Prosun Chatterjee, Bangalore (IN); Larry Seiler, Boylston, MA (US); Steven Spangler, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/454,125

(22) Filed: Mar. 9, 2017

(65) Prior Publication Data

US 2017/0178350 A1   Jun. 22, 2017

Related U.S. Application Data

(63) Continuation of application No. 14/142,805, filed on Dec. 28, 2013, now Pat. No. 9,619,898.

(51) Int. Cl.
| G06T 7/44 | (2017.01) |
| G06T 11/40 | (2006.01) |
| G06T 15/04 | (2011.01) |
| G06T 1/20 | (2006.01) |

(52) U.S. Cl.
CPC .................. G06T 7/44 (2017.01); G06T 1/20 (2013.01); G06T 11/40 (2013.01); G06T 15/04 (2013.01)

(58) Field of Classification Search
CPC ....................... G06T 2207/20024; G06T 15/04
See application file for complete search history.

(56) References Cited

U.S. PATENT DOCUMENTS

| 5,003,618 A | 3/1991 | Meno |
| 6,005,582 A | 12/1999 | Gabriel et al. |
| 7,271,810 B1 | 9/2007 | Newhall et al. |
| 9,569,880 B2 * | 2/2017 | Chatterjee ............... G06T 15/04 |

(Continued)

FOREIGN PATENT DOCUMENTS

| CN | 1659595 A | 8/2005 |
| CN | 1774725 A | 5/2006 |

(Continued)

OTHER PUBLICATIONS

R.O.C. Search Report, Patent Application No. 103141221 with English translation, dated Nov. 19, 2015; 4 pages.

(Continued)

Primary Examiner — Antonio A Caschera
(74) Attorney, Agent, or Firm — Jaffery Watson Mendonsa & Hamilton

(57) ABSTRACT

A method includes computing an anisotropic filter with a major-axis and a minor-axis for a pixel to be displayed on screen-space, where the anisotropic filter is to be applied to corresponding MIPs on a texture map. Additionally, the method includes varying the length of the major-axis of the anisotropic filter based on the angle of the major-axis of anisotropy with respect to the screen space. Further, the method includes determining a number of texels from the texture map that are to be sampled in the anisotropic filter based on the length of the modified major-axis. The color of the pixel may be determined based on the texels sampled in the anisotropic filter.

5 Claims, 12 Drawing Sheets

(56) References Cited

U.S. PATENT DOCUMENTS

| | | |
|---|---|---|
| 9,619,898 B2 | 4/2017 | Chatterjee et al. |
| 2005/0219256 A1 | 10/2005 | Donovan et al. |
| 2010/0134136 A1 | 6/2010 | Na et al. |
| 2011/0134136 A1 | 6/2011 | Seiler |

FOREIGN PATENT DOCUMENTS

| | | |
|---|---|---|
| CN | 1950851 A | 4/2007 |
| CN | 101142614 A | 3/2008 |
| CN | 102184514 A | 9/2011 |
| TW | 200923832 | 6/2009 |
| TW | 200923832 A | 6/2009 |
| TW | 201131513 | 9/2011 |
| TW | 201131513 A | 9/2011 |

OTHER PUBLICATIONS

R.O.C. Search Report, Patent Application No. 103141221, dated Nov. 19, 2015, 4 pages.

\* cited by examiner

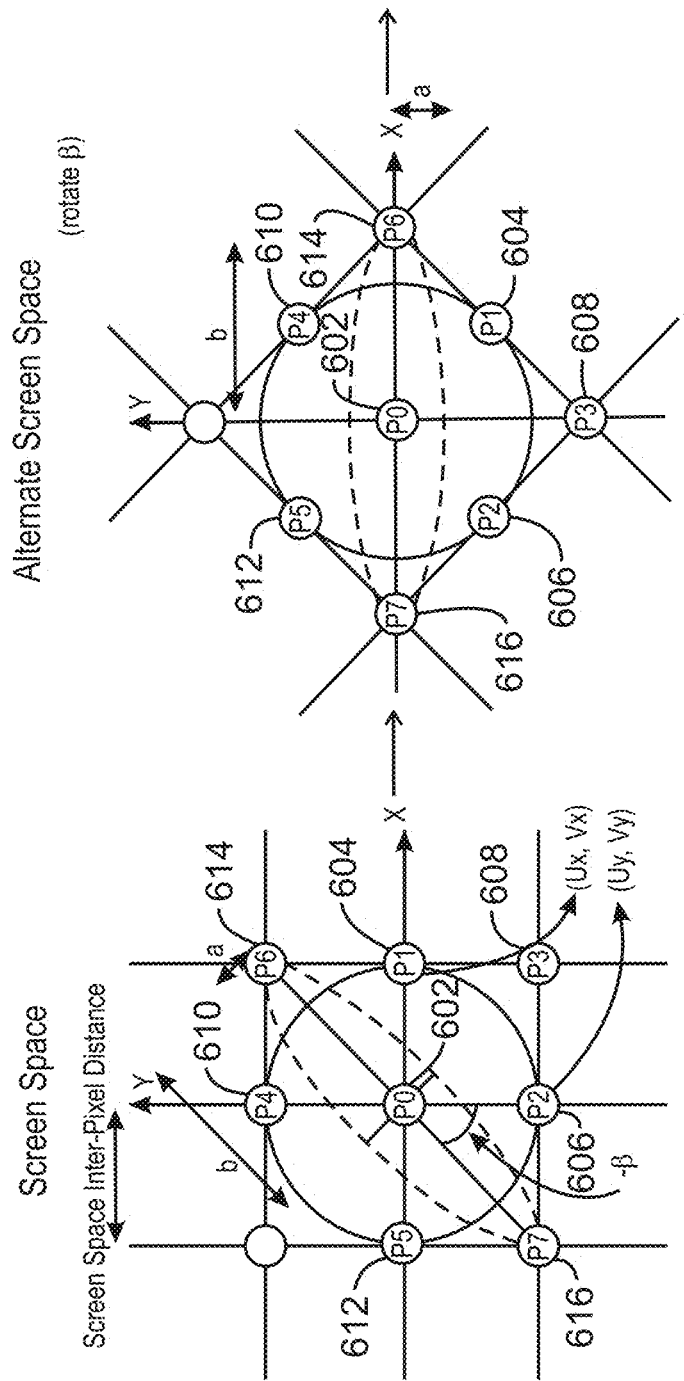

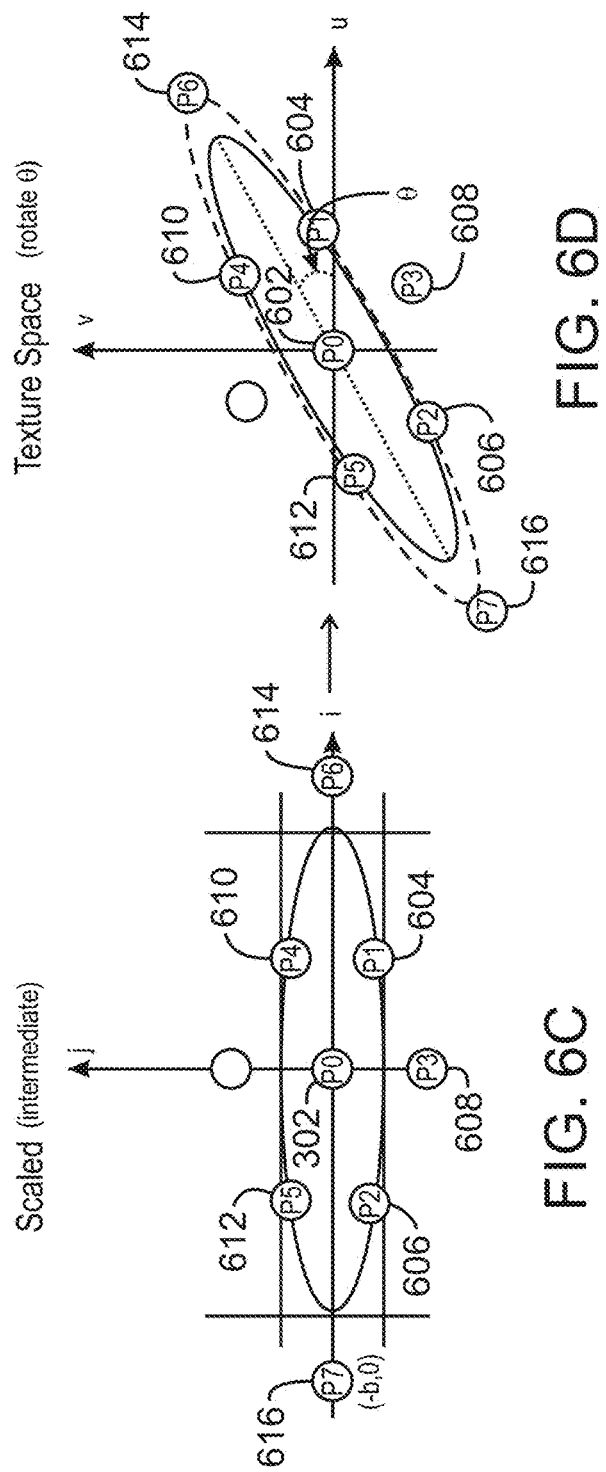

800

ANGLE-DEPENDENT ANISOTROPIC FILTERING

CROSS REFERENCE TO RELATED APPLICATION

The present application is a continuation of U.S. patent application Ser. No. 14/142,805, now issued as U.S. Pat. No. 9,619,898, by Chatterjee et al., entitled "Angle-Dependent Anisotropic Filtering," filed Dec. 28, 2013, the priority and benefit to which are claimed thereof and the contents of which are incorporated herein by reference.

BACKGROUND

In computer graphics, an object may be rendered by first rendering the geometry of the object, then applying a texture map to the object geometry. In some cases, the object geometry includes polygons that form a mesh. The texture map may be applied to the polygonal mesh. In some cases, the texels of the texture map do not have a one-to-one correspondence with the pixels of the computer screen. As a result, the texels are sampled to determine the attributes of the corresponding pixels of the computer screen. The texels may also be filtered to remove aliasing and reduce blur when the pixels are rendered.

BRIEF DESCRIPTION OF THE FIGURES

The following detailed description may be better understood by referencing the accompanying drawings, which contain specific examples of numerous objects and features of the disclosed subject matter.

FIGS. 6A, 6B, 6C, and 6D illustrate the process of mapping a filter footprint from screen space to texture space, in accordance with embodiments.

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

Figure 1:
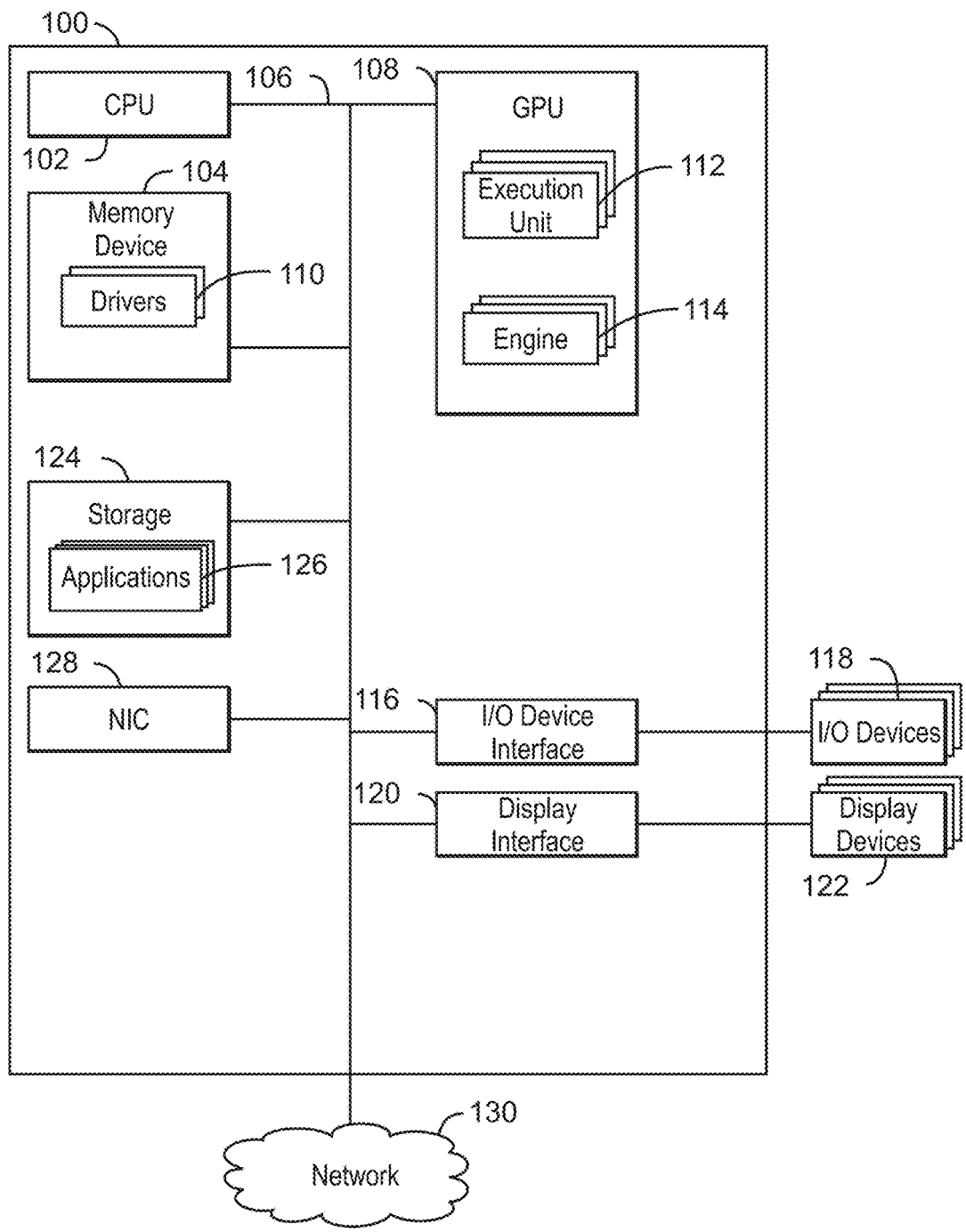
FIG. 1 is a block diagram of a computing device that may be configured for angle-dependent anisotropic filtering.

To compute a color value for a pixel of a computer screen, an area of the texture map is sampled. In some cases, the smallest unit of the texture map is known as a texel. The area of the texture map sampled is dependent upon the shape of the pixel, and may be known as a pixel footprint. For each pixel, the area sampled to compute the pixel color may change in shape and number of texels. In some cases, the number of texels sampled by each screen pixel is dependent upon the distance of each texture mapped polygon from the screen pixel, as well as the angle of each texture mapped polygon with respect to the screen pixel. The texels used to determine the color of each screen pixel may be filtered in order to improve the quality of the resulting image. Even when the sampled textures are filtered, the resulting image may include undesirable distortions and artifacts, also known as aliasing.

When the angle of each texture mapped polygon changes with respect to the screen pixel, the filtering technique used may result in a larger filter width than needed to compute the color of the screen pixel. Even with the use of adaptive length Gaussian filters, the resulting filter width is typically larger than required at various angles.

Embodiments described herein enable angle dependent anisotropic filtering. In some embodiments, texels of the texture map may not have a one-to-one correspondence with the pixels of the computer screen that will render the graphics. Further, the texture mapped polygon may be at an angle to the computer screen, causing the area sampled by the pixel to change shape. As a result, the number of texels sampled by each screen pixel is dependent upon the angle the texture mapped polygon with respect to the screen pixels as well as the distance between the texture mapped polygon and the screen pixels. The number of texels actually used to determine the color of each screen pixel is dependent upon the filtering technique used.

The number of texels used to compute the color of the screen pixels can cause artifacts in the resulting image when the number of texels sampled is too high or too low. In some cases, selected filter size may be unnecessarily high or low based on the angle of the texture mapped polygon. In this manner, the selected filter size combined with the angle of the texture mapped polygon introduces artifacts into the rendered image. Angle-dependent anisotropic filtering can keep aliasing uniform, regardless of the angle between the texture map and a screen space.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a block diagram of a computing device 100 that may be configured for angle-dependent anisotropic filtering. The computing device 100 may be, for example, a laptop computer, desktop computer, tablet computer, mobile device, or server, among others. The computing device 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the computing device 100 may include more than one CPU 102.

The memory device 104 can include random access memory (RAM), read only memory (ROM), flash memory, or any other suitable memory systems. For example, the memory device 104 may include dynamic random access memory (DRAM). The memory device 104 includes drivers 110. The drivers 110 are configured to execute the instructions for the operation of various components within the computing device 100. The device driver 110 may be software, an application program, application code, or the like.

The computing device 100 may also include a graphics processing unit (GPU) 108. As shown, the CPU 102 may be coupled through the bus 106 to the GPU 108. The GPU 108 may be configured to perform any number of graphics operations within the computing device 100. For example, the GPU 108 may be configured to render or manipulate graphics images, graphics frames, videos, or the like, to be displayed to a user of the computing device 100. In some embodiments, the GPU 108 includes a number of execution units 112, wherein each execution unit is configured to processes a graphics workload in parallel with other execution units. Additionally, the GRP 108 may include a number of engines 114. Each engine 114 may include logic to perform a specific graphics task, such as a sampler engine that includes logic to sample texel values at the particular coordinates, and then return those values to a requesting execution unit so that the pixel color may be computed.

The CPU 102 may be connected through the bus 106 to an input/output (I/O) device interface 116 configured to connect the computing device 100 to one or more I/O devices 118. The I/O devices 118 may include, for example, a keyboard and a pointing device, wherein the pointing device may include a touchpad or a touchscreen, among others. The I/O devices 118 may be built-in components of the computing device 100, or may be devices that are externally connected to the computing device 100.

The CPU 102 may also be linked through the bus 106 to a display interface 120 configured to connect the computing device 100 to a display device 122. The display device 122 may include a display screen that is a built-in component of the computing device 100. The display device 122 may also include a computer monitor, television, or projector, among others, that is externally connected to the computing device 100.

The computing device also includes a storage device 124. The storage device 124 is a physical memory such as a hard drive, an optical drive, a thumbdrive, an array of drives, or any combinations thereof. The storage device 124 may also include remote storage drives. The storage device 124 includes any number of applications 126 that are configured to run on the computing device 100. In examples, an application 126 may be a video game that uses the GPU 108 to render 3D graphics.

The computing device 100 may also include a network interface controller (NIC) 128 configured to connect the computing device 100 through the bus 106 to a network 130. The network 130 may be a wide area network (WAN), local area network (LAN), or the Internet, among others.

The block diagram of FIG. 1 is not intended to indicate that the computing device 100 is to include all of the components shown in FIG. 1. Further, the computing device 100 may include any number of additional components not shown in FIG. 1, depending on the details of the specific implementation.

The GPU 108 can process data signals and render images in response to data stored in the memory 104. The GPU 108 can contain hardware or software configured to assign attributes such as colors to pixels of a two-dimensional screen space to be displayed on a display device 122, such as a display screen. The GPU 108 can perform anisotropic filtering, in which the GPU 108 determines the color of each pixel by sampling a number of texels from a texture map corresponding to a three-dimensional or two-dimensional object, which may be stored in the memory 104. The method of sampling of the texels can be dependent on the angle of the texture map with respect to the screen space.

Figure 2:
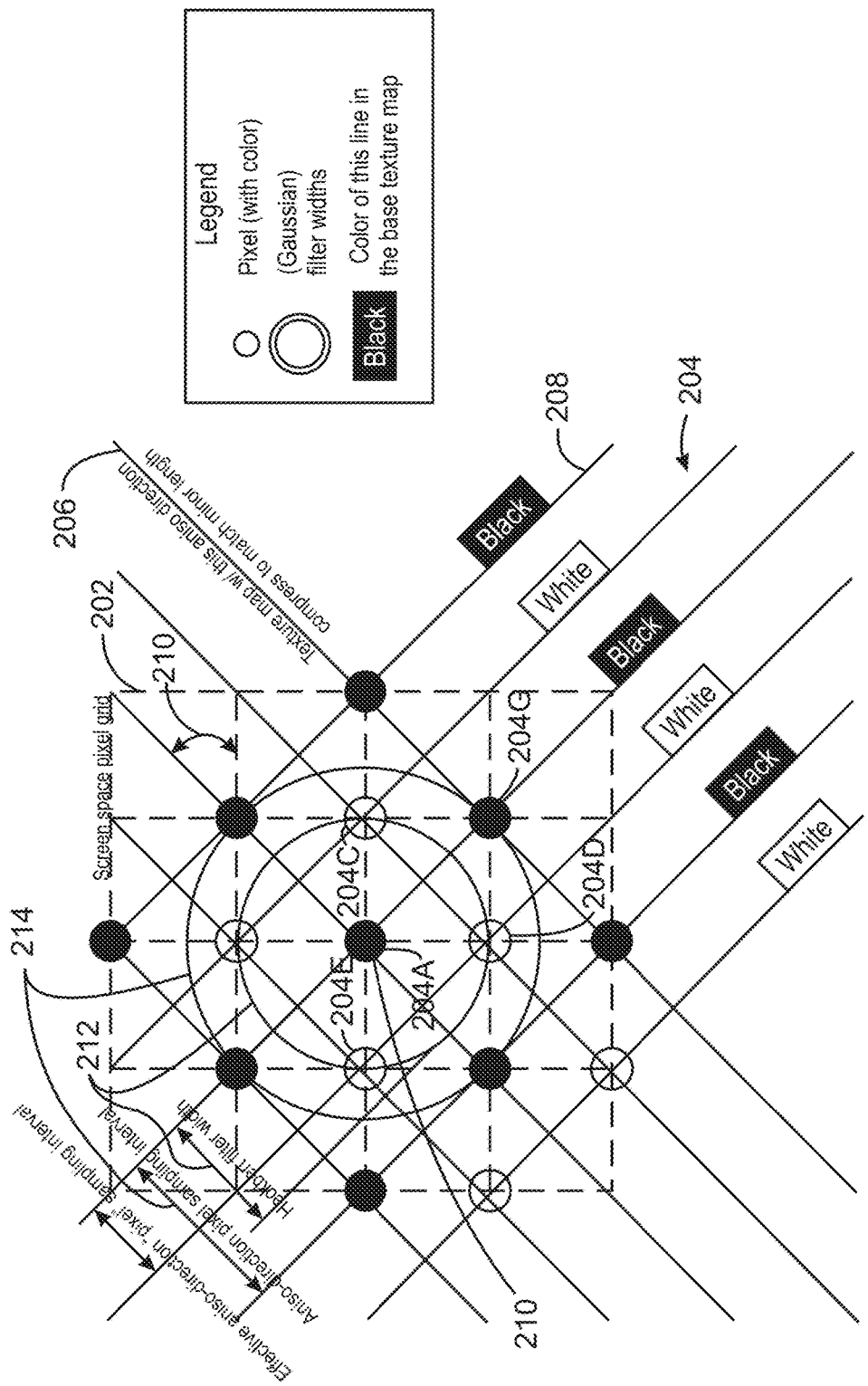
FIG. 2 is an illustration of a texture map filtered into a screen space.

FIG. 2 is an illustration of a texture map filtered into a screen space. A screen space pixel grid 202 is represented by a dashed grid in FIG. 2. A texture map 204 is represented by a grid of solid lines in FIG. 2. A major axis of the texture map 204 is in a direction illustrated at reference number 206. In embodiments, the major axis occurs in the anisotropic direction. Moreover, a minor axis of the texture map is illustrated at reference number 208. For ease of description with respect to the relationship between the screen space grid 202 and the texture map 204, the texture map 204 is illustrated after being compressed in the major-axis direction by a ratio between the major axis and the minor axis. In other words, the anisotropic major-axis length has been compressed to match the minor-axis length. The descriptions herein assume this compression for ease of explanation. However, the major axis and the minor axis of the texture map may be of any length. Additionally, in FIG. 2 the anisotropic footprint's major axis is shown rotated 45° with respect to the screen space grid 202. This screen space angle of 45° ($\beta$) is illustrated at reference number 210. In this case, just for simplicity, the anisotropic footprint's major axis is shown aligned to the texture map's y-axis. In general, however, it can be any angle in general. Each intersection of the screen space pixel grid 202 represents a pixel that samples a number of texels from the texture map 204. For example, the pixel at reference number 210 may sample a number of texels from the texture map 204 to determine a color. As illustrated in FIG. 2, the pixels described herein are either white or black, however, any color pixel may be used, and the texel colors described herein are for descriptive purposes. The screen space angle of $\beta$, as the angle between the screen-space $\{-y\}$ axis and the direction of the major axis is illustrated in FIG. 6A.

The effective sampling rate depends on the screen-space angle $\beta$ of anisotropic major-axis for an output image that results from anisotropic filtering. Furthermore, moiré is a function of the low-pass pre-filter and the sampling rate. As one approaches a screen-space angle $\beta$ of 45°, the effective pixel sampling interval increases by up to $\sqrt{2}$ with respect to $\beta$ of 0° or 90°. Specifically, the circle at reference number 214 with the aniso-direction pixel sampling interval touches each of the 45° pixel neighbors, instead of the 0° and 90° pixel neighbors as does the inner circle at reference number 212 that used Heckbert's recommended filter width. However, when sampling the 45° pixel neighbors, each alternate line's pixels are offset half-way with respect to the neighboring line. This results in effectively 2 times the samples in the anisotropic major-axis (45°) direction when using the aniso-direction pixel sampling interval and outer circle at reference number 214. Consequently, the filter size can be reduced by up to $$\frac{1}{\sqrt{2}}$$

while retaining the same extent of moiré as at the axes. In this manner, amount of computations may be reduced while increasing performance for a given maximum acceptable amount of moiré.

This anisotropic major-axis angle-dependent anisotropic filtering works across any filter shape, such as Gaussian, Box, or any other filter type selected as a basis for the pre-filter in anisotropic filtering. Heckbert's thesis of 1989, which is used as the accepted reference for anisotropic filtering, does not account for this screen space angle of anisotropic filtering influencing sampling frequency. Instead, it recommends a uniform filter size for all angles. The uniform filter size results in differing moiré at different angles.

Heckbert's suggested filter-length has a radius equal to the screen-space spacing of pixels as indicated by the Heckbert filter width and inner circle at reference number 212. Using Heckbert's suggested filter length, the texture map 204 is oversampled when the anisotropic compression direction is at any other angle apart from the direction of the axes of the texture map 204, as has been explained above using 45° as an exemplary case. With this basis, the following points will show the Heckbert recommended width to incur unneeded blur at 45°, while the commonly suggested box-filter will be shown to cause aliasing at both angles while more so at 0°. The techniques described herein enable uniform moiré at all angles.

Figure 3:
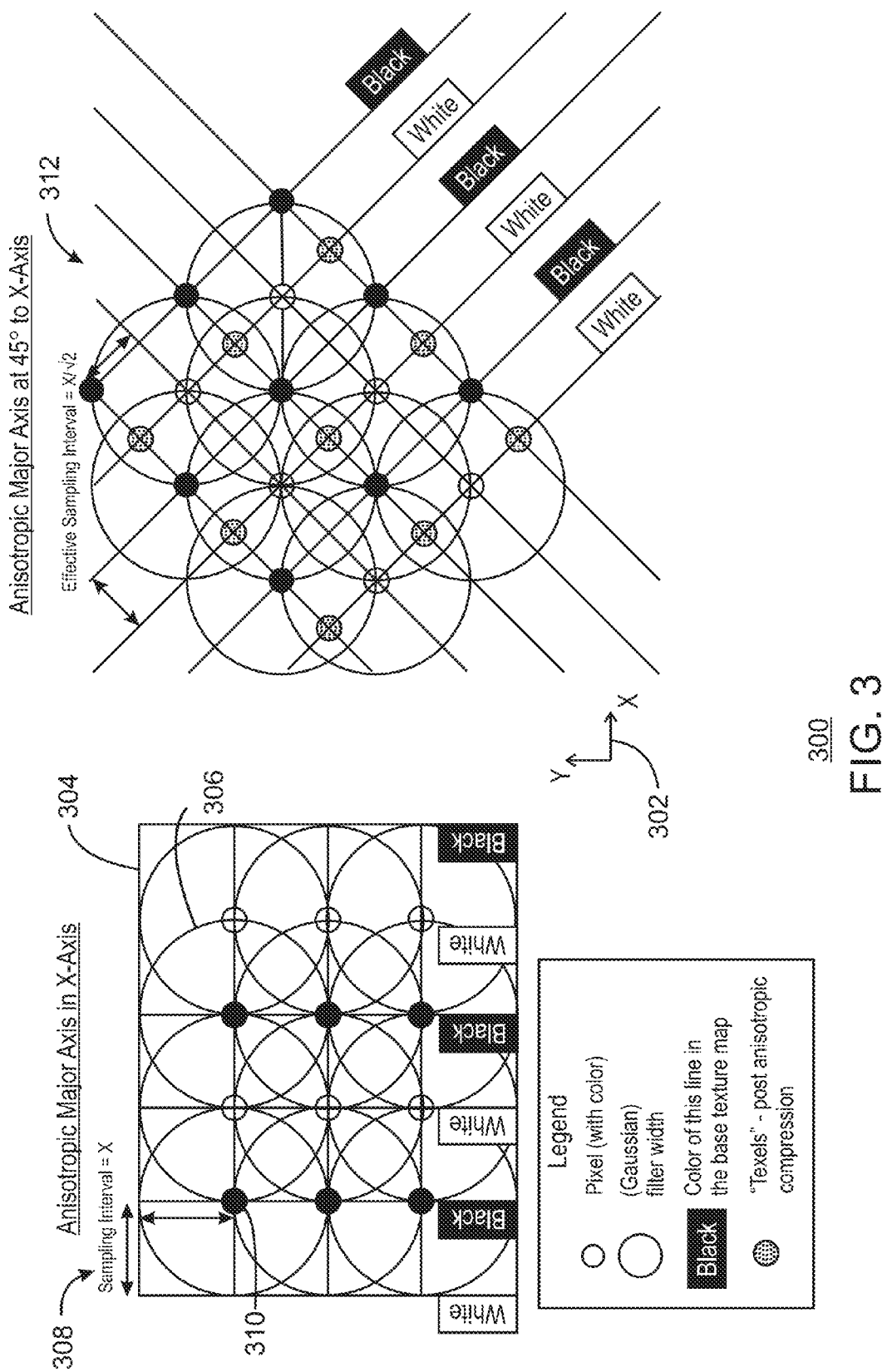
FIG. 3 is an illustration of two anisotropic filtering footprint shapes.

FIG. 3 is an illustration of two anisotropic filtering footprint shapes. A screen space pixel grid is oriented with respect to the Cartesian coordinates shown at reference number 302. A texture map 304 includes a number of texels like 310. The anisotropic major axis of the texture map 304 is in the direction of the screen space x-axis, and the angle of the texture map is 0°. For ease of description, the anisotropic major-axis direction is selected to be the direction of the texture-map's x-axis right through for simplicity of viewing. However, this need not be the case in general, and hence this angle is later referred to as $\theta$. As discussed above, Heckbert's thesis recommends that the footprint in the screen-space be of radius equal to the inter-screen-space-pixel distance in order to meet the Nyquist criterion of the footprint of the filter being twice the sampling rate. Such a sampling interval may be x, is indicated by the sampling interval 308. The circles 306 each have a radius equal to x, which is the screen-space spacing of pixels along the major axis of the screen space pixel grid. However, when the anisotropic major axis is at 45° to these axes, as illustrated by the texture map 312, the effective sampling interval is x/$\sqrt{2}$ as explained in the prior point. As a result, retaining Heckbert's recommended filter footprint of radius x at this angle is an overkill and results in more blurring than in the 0° case of the texture map 304.

Figure 4:
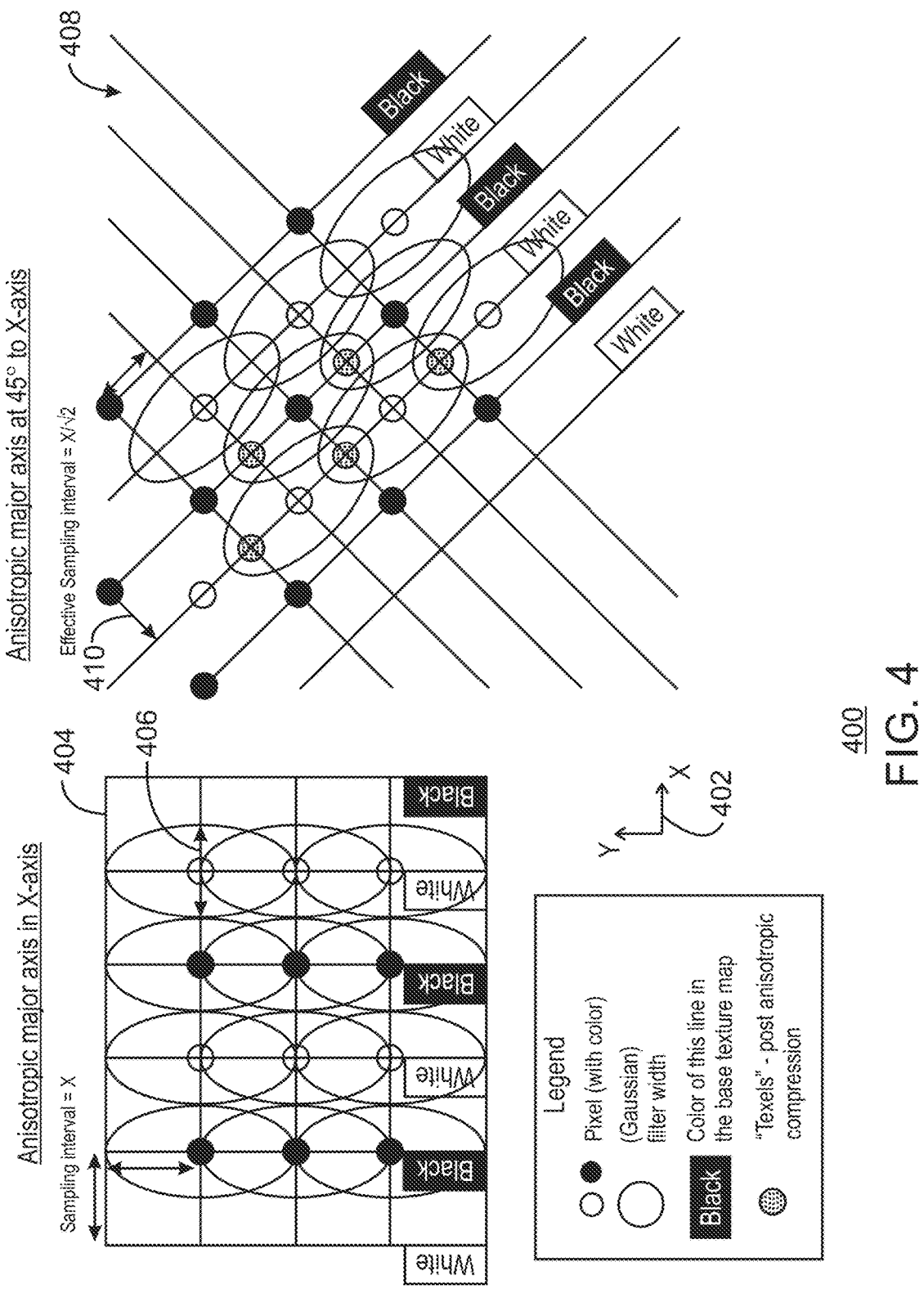
FIG. 4 is an illustration of anisotropic filtering using a box filter footprint in the screen space domain.

FIG. 4 is an illustration of anisotropic filtering using a box filter footprint in the screen space domain. A screen space pixel grid 404 is oriented with respect to the Cartesian coordinates shown at reference number 402. The resulting major axis filter length is half of Heckbert's major axis filter length in FIG. 4, as illustrated at reference number 406. As a result, the coverage of the texture map by a box filter is insufficient when compared to the Nyquist criterion, which leads to aliasing. The minor direction filter length is the same as the Nyquist recommended filter width. When the texture map 408 has an anisotropic major axis at 45° with respect to the screen space grid, the filter width is $\sqrt{2}$ times wider in the direction of the major axis of the texture map 408, but still be ½ the Heckbert filter width, and $$\frac{1}{\sqrt{2}}$$

times a recommendation of the present techniques as illustrated by the effective sampling interval at reference number 410.

Note that the box filter shape is not a circle in the screen-space domain. Rather, the box filter shape is an ellipse. While Heckbert's thesis showed that a transformation from a circle in the screen-space domain to an ellipse in the texture space domain is affine, the affinity property can be shown to hold for an ellipse in the screen space domain to an ellipse in the texture space domain. As a result, the box filter today is also affine to the extent that a not-so-elliptical shape can be approximated as an ellipse shape. Additionally, since the basic filter is a bilinear filter, when a texture-space angle θ is at 45°, it effectively extends the anisotropic minor axis length. Extending the anisotropic minor axis length has no bearing on the computationally intensive major axis.

Figure 5:
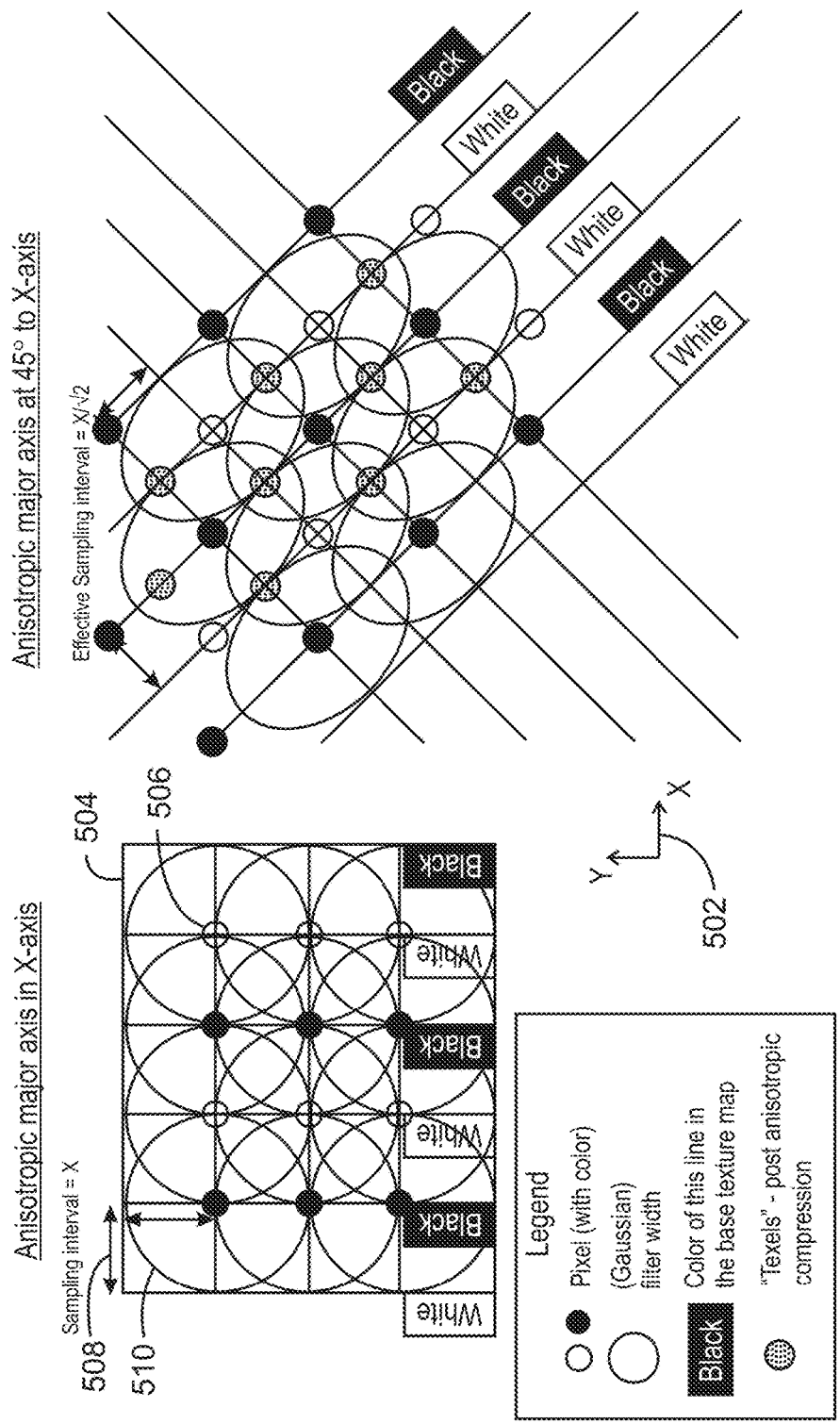
FIG. 5 illustrates the anisotropic filtering method which varies the filter length based on the angle of the anisotropic major-axis with the screen-space axes.

FIG. 5 illustrates the anisotropic filtering method of this patent which varies the filter length based on the angle of the anisotropic major-axis with the screen-space axes. A screen space pixel grid is oriented with respect to the Cartesian coordinates shown at reference number 502. A texture map 504 includes a number of texels like 506. The circles 510 each have a radius equal to x, which is the sampling interval 508. By varying the filter length according to the angle of the anisotropic major-axis with the screen-space axis, the filter width is maintained equal to the minimum Nyquist recommended width at all angles of the major-axis with the screen-space axis. As a result, the moiré at all angles is equal. While a Nyquist length filter footprint has been illustrated here as being maintained for all angles, however, any filter footprint may be used as a base, even one exceeding Nyquist guidelines. The minor axis length is retained at the same bilinear-guided length, and is equal to the suggested Nyquist length. Retaining the minor axis length at this length contributes towards allowing the anisotropic major-axis filter length to be reduced to the "effective sampling interval.". The grayed-out circles can act as effective screen-space "pixels" only if their color is accounted for in the other pixels on the minor-axis line. Accordingly, at 0° the width of the sampling interval is X, which is same as Heckbert and as guided by Nyquist. At 45° the width is x/√2, since the Nyquist/inter-pixel-distance is x/√2 at this angle.

In each example above, the value of the screen space angle β was given in order to illustrate how changing the screen space angle β affects the sampling interval to keep distortions such as moiré under a certain threshold. To compute β, a transform is done to map the screen-space footprint to the texel-space footprint. For ease of description, the screen-space footprint is selected to be circular in the interest of equations being slightly simpler in doing this, and being able to leverage equations in relation to the widely accepted Heckbert's thesis. However, as has been stated earlier, it can be shown that ellipse to ellipse transforms are also affine and hence the results below are translatable to them. This can be accomplished by adding a scaling transform step in the x and y direction prior to the transform steps shown below.

FIGS. 6A, 6B, 6C, and 6D illustrate the process of mapping a filter footprint from screen space to texture space. In the embodiment shown in FIGS. 6A and 6B, the screen-space footprint is chosen to be circular. However, it is to be noted that ellipse to ellipse transforms are also affine. The pixels are labeled with reference numbers 602-616.

The computed major axis length of the ellipse is represented by "b". In short, it is the "major length" of anisotropy. Similar "a" is the minor axis length of the ellipse, hence of anisotropy. β is the angle between the major axis of anisotropy/ellipse from the screen-space y-axis. θ is the angle between the major axis of anisotropy/ellipse from the textures-space x-axis.

It is to be noted that with respect to the typical parametric to implicit conversion reference, the start point for the screen space is usually chosen as the "alternate screen space" shown in FIG. 6B. Pertinently, the equations assume that the anisotropic major axis is aligned to the screen space x-axis for that particular version of the transform. The reason for doing so is that in matrix transformation from circle to ellipse, the start-angle doesn't matter in showing the transform, hence isn't used in the generic equation for that transform. But this is precisely the angle that is of interest here, and needs to be found out. Hence this one step is added to the standard process. A simple rotation (shown in figures as β) before the "alternate screen space" helps account for this angle. "Ux" represents the difference in "u" (or "s" as it is sometimes referred to) texture coordinate for a unity pixel shift in x-direction. Notations for Uy, Vx, Vy follow on similar lines.

The location of pixel 616 in the screen space can be calculated from pixels 604 and 606. This is a simple matrix rotation by −β angle will give the coordinates for 616. Using the relationship of a circle in its parametric coordinate system and its linear (x,y) coordinates system, for the (u,v) coordinates shown above is given by:

$$[u, v] = [\cos(t), \sin(t)] \begin{bmatrix} Uy & Vy \\ Ux & Vx \end{bmatrix}$$

Where "t" is the angle, and is zero at the Y-axis; and the (Ux,Vx) and (Uy,Vy) are the coordinates 604 and 606 respectively as shown in the FIGS. 6A and 6B. Hence, substituting −β here gives $$u = Uy \cdot \cos\beta - Ux \cdot \sin\beta$$

$$v = Vy \cdot \cos\beta - Vx \cdot \sin\beta$$

Following that, u and v in the texture space of FIG. 6D can be calculated from the scaled intermediate space of FIG. 6C. This too is a simple matrix rotation by θ angle. The other thing to note here is that in the "scaled" coordinate system, the (u,v) is simply the left-most point on the ellipse' major axis=(−b,0). Hence, this amounts to rotating the (−b,0) coordinate by θ:

$$[u, v] = [-b, 0] \begin{bmatrix} \cos\theta & \sin\theta \\ -\sin\theta & \cos\theta \end{bmatrix}$$

Hence: $u = -b \cdot \cos\theta$ $v = -b \cdot \sin\theta$

Note that the (u,v) of 616 in FIG. 6D is essentially the same as the (u,v) of 616 in FIG. 6A. Hence from the calculations above, equating u & v (since they are the same texture coordinate essentially), they can be solved to get:

$$\sin\beta = \frac{b \cdot (Vy \cdot \cos\theta - Uy \cdot \sin\theta)}{(Vy \cdot Ux - Vx \cdot Uy)}$$

$$\cos\beta = \frac{b \cdot (Ux \cdot \sin\theta - Vx \cdot \cos\theta)}{(Vx \cdot Uy - Vy \cdot Ux)}$$

These are the factors needed to scale the "unity" anisotropic major axis of the "screen space."

The "effective sampling interval" is the distance between pixel 602 and pixel 606 or pixel 612, but in the direction of the anisotropic major axis. Hence, note that this scaling factor is:

cos β for abs(β)<45°
sin β for abs(β)>45° and abs(β)<90° (since cos(90−β)=sin β)

This expresses the scale factors for the bottom left quadrant. For other quadrants, simply taking the absolute value of cos β and sin β gives the scaling factor.

Anisotropic filtering can be tested and observed. In examples discussed below, three different methods of anisotropic filtering are applied to a checkerboard tunnel, and the results at 0° and 45° are analyzed. Due to the nature of the "effective sampling interval", as one proceeds toward 45° angles, the effective sampling interval progressively decreases. When this is accounted for, the simplistic "Nq/2" and "Nq" curves change as shown in FIG. 7

Figure 7:
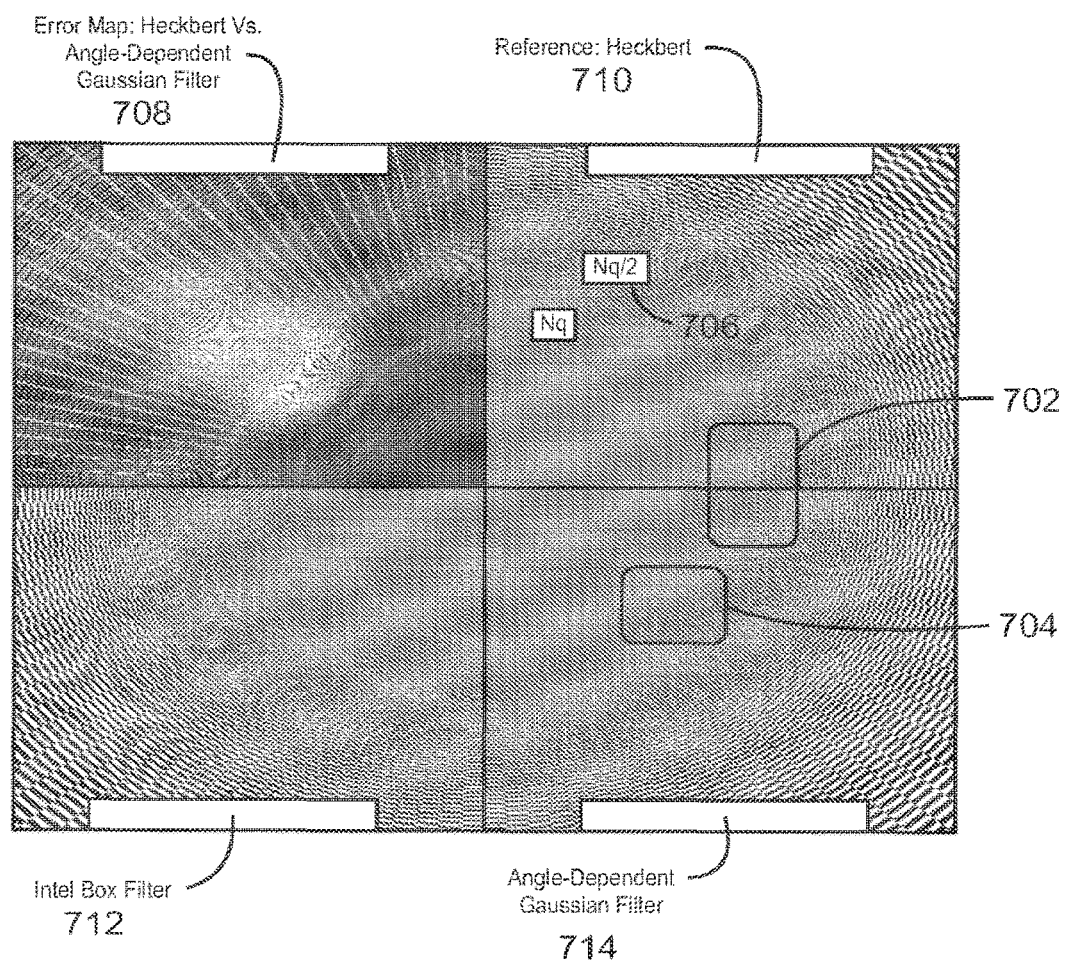
FIG. 7 is an example of an image rendered using various filtering techniques and the error of the adaptive filtering against ideal Heckbert sampling.

FIG. 7 is an example of an image rendered using angle dependent Gaussian filtering 714 and the error 708 of this filtering against the ideal Heckbert sampling 710. An angle-dependent Gaussian filter length is applied to the checkerboard tunnel. Note the aliasing effects in the boxes at reference number 702 and 704. At both 0° and 45°, aliasing effects on the Nq/2 frequency line at reference number 706 are visible. This is a result of the effective sampling frequency increasing from 1x through to √2x as it proceeds from 0° through 45°. Similarly, the filter's width in frequency domain is made to increase in tandem with this. This is accounted for by the screen space angle θ dependent factors of cos β and sin β calculated earlier.

Accordingly, there will be a uniform aliasing amplitude effect on the Nq/2 frequency line at reference number 706 for all angles of the major-axis of anisotropy with the screen-space axis. This results in reduced work as the angle proceeds towards 45°. If an image has a uniform distribution of all anisotropic angles, this could reduce processing time by 10% (sin(π/4)/(π/4))—basically an integral from 0° to 45°, normalized. For ease of description, the techniques described herein have been described using Gaussian filters. However, these techniques are applicable to any filter type, such as a box filter 712, triangle filter, and the like.

As a side method that comes out of this, note that since the actual number of texels in the direction of the major-axis keep increasing as the angle moves towards 45°, it is possible to make use of this to completely remove all aliasing at 45° by inverting the multiplying factors. This effectively makes the filter double the Nyquist recommended length in the time-domain. Consequently, there is very little aliasing that occurs at 45°. Hence it is possible to further reduce the aliasing effects, as the angle approaches 45°, than Heckbert's thesis suggests if so desired.

Figure 8:
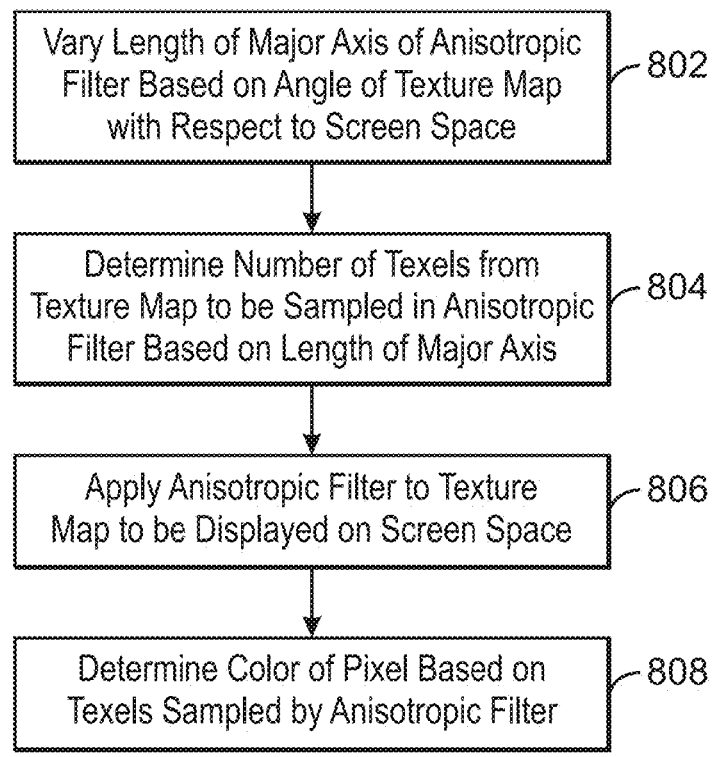
FIG. 8 is a process flow diagram of a method for anisotropic filtering.

FIG. 8 is a process flow diagram of a method for anisotropic filtering. The method 800 can be performed by a processor, a GPU, or a chipset in an electronic device used to render graphics.

At block 802, the length of the major axis of the anisotropic filter is varied based on an angle of the major-axis with respect to a screen-space axis. The angle between the major-axis of anisotropy and the y-axis of the screen-space can be calculated. The length of the major-axis of the anisotropic filter can be increased or decreased depending on the magnitude of the calculated angle.

At block 804, a number of texels from the texture map to be sampled in the anisotropic filter is determined based on the length of the major axis. The texels contained within the anisotropic filter with this modified major-axis are to be sampled. At block 806, an anisotropic filter corresponding to a pixel is computed with respect to a texture map to be displayed on a screen space. The anisotropic filter contains a major axis and a minor axis. The texture map has an x-axis and a y-axis, and the screen space has a horizontal axis and a vertical axis.

At block 808, the color of the pixel is determined based on the texels sampled in the anisotropic filter. In some embodiments, the color value of the pixel may be a weighted average color value of the texels contained within the anisotropic filter based on the filter shape. In the examples shown above, a Gaussian filter weight was used.

Figure 9:
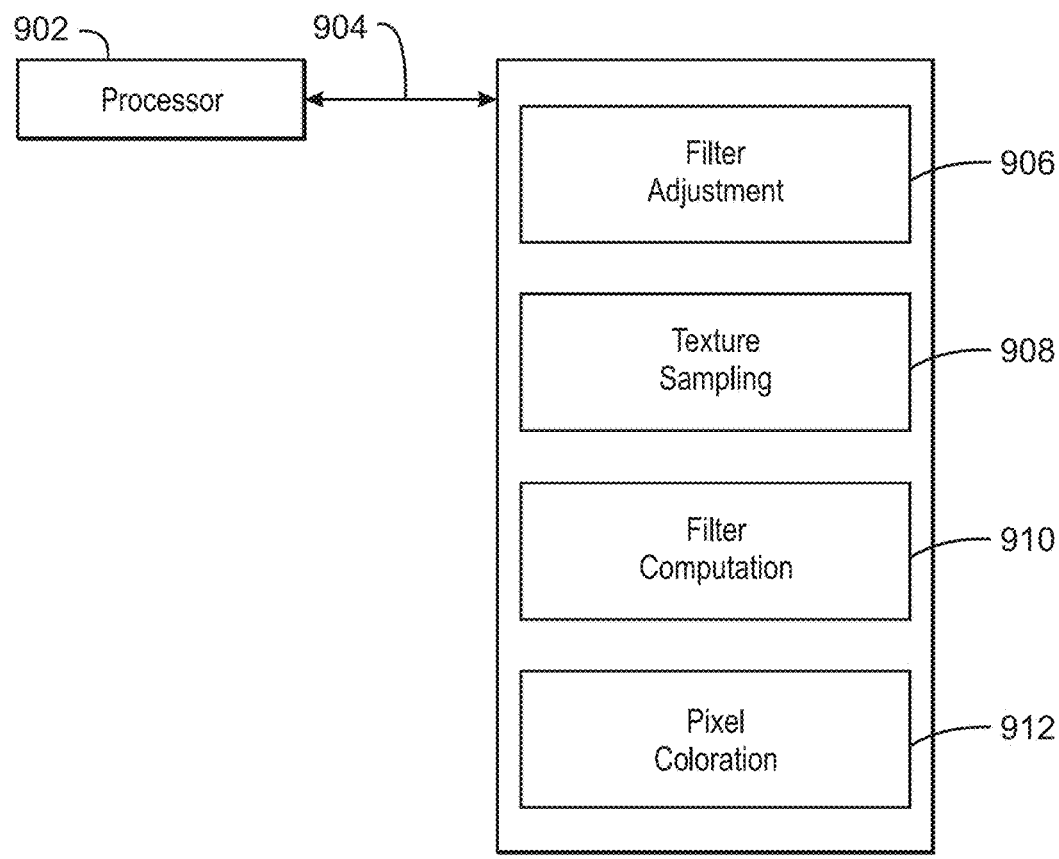
FIG. 9 is a block diagram showing a tangible, non-transitory computer-readable medium that stores instructions for anisotropic filtering.

FIG. 9 is a block diagram showing a tangible, non-transitory computer-readable medium that stores instructions for anisotropic filtering. The tangible, non-transitory computer-readable media 900 may be accessed by a processor 902 over a computer bus 904. Furthermore, the tangible, non-transitory computer-readable medium 900 may include code configured to direct the processor 902 to perform the methods described herein.

The various software components discussed herein may be stored on one or more tangible, non-transitory computer-readable media 900, as indicated in FIG. 9. A filter adjustment module 906 may be configured to vary the length of the major-axis of the anisotropic filter based on an angle of the major-axis with respect to the screen-space. A texture sampling module 908 may be configured to determine a number of texels from the texture map to be sampled in the anisotropic filter based on the modified length of the major-axis. For example, a filter computation module 910 may be configured to compute an anisotropic filter of a pixel to a texture map to be displayed on a screen space. A pixel coloration module 912 may be configured to determine the color of the pixel based on the texels sampled in the modified anisotropic filter.

The block diagram of FIG. 9 is not intended to indicate that the tangible, non-transitory computer-readable media 900 is to include all of the components shown in FIG. 9. Further, the tangible, non-transitory computer-readable media 900 may include any number of additional components not shown in FIG. 9, depending on the details of the specific implementation.

Figure 10:
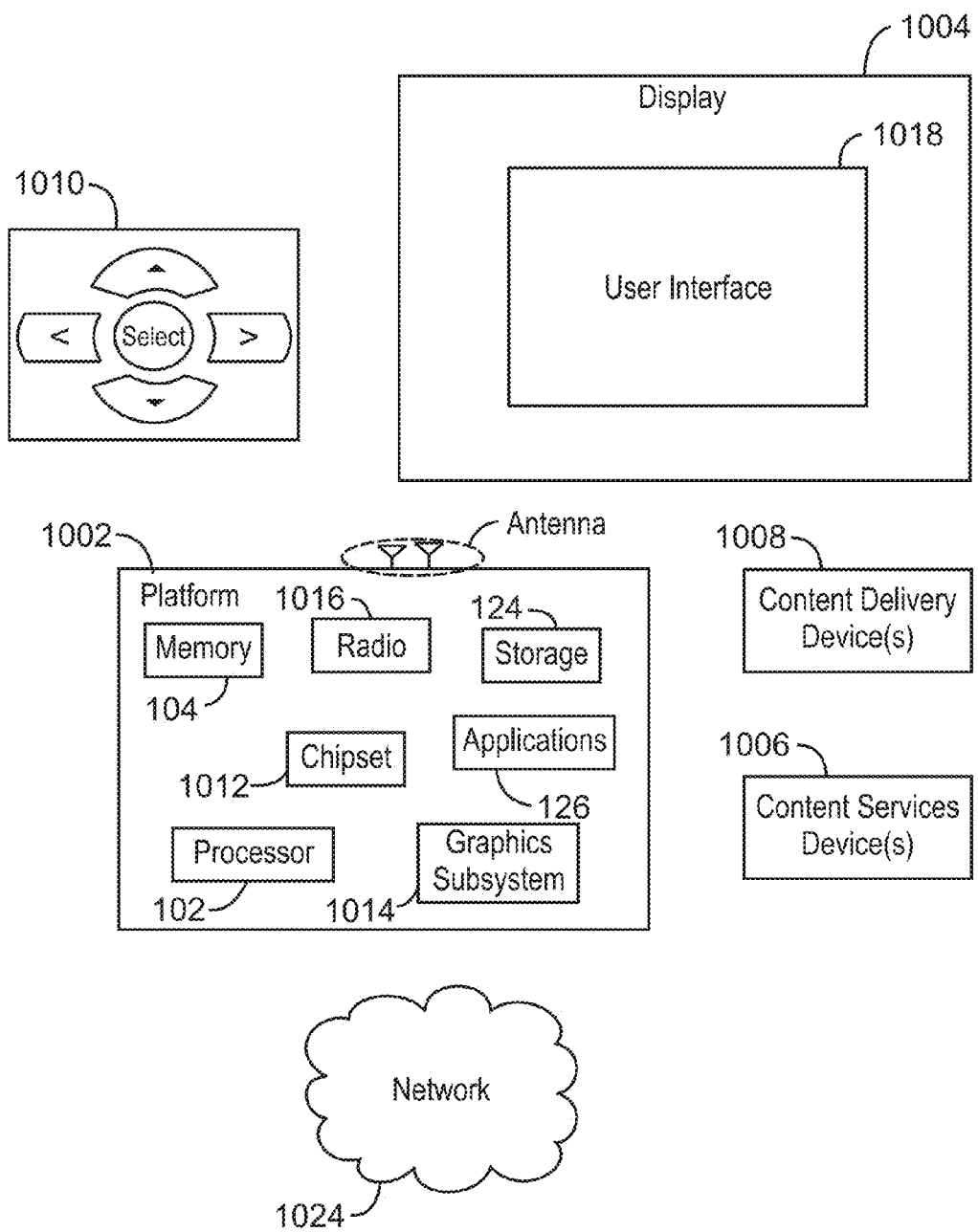
FIG. 10 is a block diagram of an exemplary system that may be used with angle dependent Gaussian filtering.

FIG. 10 is a block diagram of an exemplary system 1000 that may be used with angle dependent Gaussian filtering. In some embodiments, the system 1000 is a media system. In addition, the system 1000 may be incorporated into a personal computer (PC), laptop computer, ultra-laptop computer, server computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, a printing device, an embedded device or the like.

In various embodiments, the system 1000 comprises a platform 1002 coupled to a display 1004. The platform 1002 may receive content from a content device, such as content services device(s) 1006 or content delivery device(s) 1008, or other similar content sources. In some cases, the platform 1002 and all components within the platform 1002 may be implemented as a system on chip (SOC). A navigation controller 1010 including one or more navigation features may be used to interact with, for example, the platform 1002 and/or the display 1004. Each of these components is described in more detail below.

The platform 1002 may include any combination of a chipset 1012, a central processing unit (CPU) 102, a memory device 104, a storage device 124, a graphics subsystem 1014, applications 126, and a radio 1016. The chipset 1012 may provide intercommunication among the CPU 102, the memory device 104, the storage device 124, the graphics subsystem 1014, the applications 126, and the radio 1016. For example, the chipset 1012 may include a storage adapter (not shown) capable of providing intercommunication with the storage device 124.

The CPU may be implemented as Complex Instruction Set Computer (CISC) or Reduced Instruction Set Computer (RISC) processors, x86 instruction set compatible processors, multi-core, or any other microprocessor or central processing unit (CPU). In some embodiments, the CPU 102 includes multi-core processor(s), multi-core mobile processor(s), or the like. The memory device 104 may be implemented as a volatile memory device such as, but not limited to, a Random Access Memory (RAM), Dynamic Random Access Memory (DRAM), or Static RAM (SRAM). The storage device 124 may be implemented as a non-volatile storage device such as, but not limited to, a magnetic disk drive, optical disk drive, tape drive, solid state drive, an internal storage device, an attached storage device, flash memory, battery backed-up SDRAM (synchronous DRAM), and/or a network accessible storage device. In some embodiments, the storage device 124 includes technology to increase the storage performance enhanced protection for valuable digital media when multiple hard drives are included, for example.

The graphics subsystem 1014 may perform processing of images such as still or video for display. The graphics subsystem 1014 may include a graphics processing unit (GPU), such as the GPU 408, or a visual processing unit (VPU), for example. An analog or digital interface may be used to communicatively couple the graphics subsystem 1014 and the display 1004. For example, the interface may be any of a High-Definition Multimedia Interface, DisplayPort, wireless HDMI, and/or wireless HD compliant techniques. The graphics subsystem 1014 may be integrated into the CPU 102 or the chipset 1012. Alternatively, the graphics subsystem 1014 may be a stand-alone card communicatively coupled to the chipset 1012.

The graphics and/or video processing techniques described herein may be implemented in various hardware architectures. For example, graphics and/or video functionality may be integrated within the chipset 1012. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 1016 may include one or more radios capable of transmitting and receiving signals using various suitable wireless communications techniques. Such techniques may involve communications across one or more wireless networks. Exemplary wireless networks include wireless local area networks (WLANs), wireless personal area networks (WPANs), wireless metropolitan area network (WMANs), cellular networks, satellite networks, or the like. In communicating across such networks, the radio 1016 may operate in accordance with one or more applicable standards in any version.

The display 1004 may include any television type monitor or display. For example, the display 1004 may include a computer display screen, touch screen display, video monitor, television, or the like. The display 1004 may be digital and/or analog. In some embodiments, the display 1004 is a holographic display. Also, the display 1004 may be a transparent surface that may receive a visual projection. Such projections may convey various forms of information, images, objects, or the like. For example, such projections may be a visual overlay for a mobile augmented reality (MAR) application. Under the control of one or more applications 126, the platform 1002 may display a user interface 1018 on the display 1004.

The content services device(s) 1006 may be hosted by any national, international, or independent service and, thus, may be accessible to the platform 1002 via the Internet, for example. The content services device(s) 1006 may be coupled to the platform 1002 and/or to the display 1004. The platform 1002 and/or the content services device(s) 1006 may be coupled to a network 1024 to communicate (e.g., send and/or receive) media information to and from the network 1024. The content delivery device(s) 1008 also may be coupled to the platform 1002 and/or to the display 1004.

The content services device(s) 1006 may include a cable television box, personal computer, network, telephone, or Internet-enabled device capable of delivering digital information. In addition, the content services device(s) 1006 may include any other similar devices capable of unidirectionally or bidirectionally communicating content between content providers and the platform 1002 or the display 1004, via the network 1024 or directly. It will be appreciated that the content may be communicated unidirectionally and/or bidirectionally to and from any one of the components in the system 1000 and a content provider via the network 1024. Examples of content may include any media information including, for example, video, music, medical and gaming information, and so forth.

The content services device(s) 1006 may receive content such as cable television programming including media information, digital information, or other content. Examples of content providers may include any cable or satellite television or radio or Internet content providers, among others.

In some embodiments, the platform 1002 receives control signals from the navigation controller 1010, which includes one or more navigation features. The navigation features of the navigation controller 1010 may be used to interact with the user interface 1018, for example. The navigation controller 1010 may be a pointing device or a touchscreen device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures. Physical gestures include but are not limited to facial expressions, facial movements, movement of various limbs, body movements, body language or any combinations thereof. Such physical gestures can be recognized and translated into commands or instructions.

Movements of the navigation features of the navigation controller 1010 may be echoed on the display 1004 by movements of a pointer, cursor, focus ring, or other visual indicators displayed on the display 1004. For example, under the control of the applications 126, the navigation features located on the navigation controller 1010 may be mapped to virtual navigation features displayed on the user interface 1018. In some embodiments, the navigation controller 1010 may not be a separate component but, rather, may be integrated into the platform 1002 and/or the display 1004.

The system 1000 may include drivers (not shown) that include technology to enable users to instantly turn on and off the platform 1002 with the touch of a button after initial boot-up, when enabled, for example. Program logic may allow the platform 1002 to stream content to media adaptors or other content services device(s) 1006 or content delivery device(s) 1008 when the platform is turned "off." In addition, the chipset 1012 may include hardware and/or software support for 5.1 surround sound audio and/or high definition 7.1 surround sound audio, for example. The drivers may include a graphics driver for integrated graphics platforms. In some embodiments, the graphics driver includes a peripheral component interconnect express (PCIe) graphics card.

In various embodiments, any one or more of the components shown in the system 1000 may be integrated. For example, the platform 1002 and the content services device(s) 1006 may be integrated; the platform 1002 and the content delivery device(s) 1008 may be integrated; or the platform 1002, the content services device(s) 1006, and the content delivery device(s) 1008 may be integrated. In some embodiments, the platform 1002 and the display 1004 are an integrated unit. The display 1004 and the content service device(s) 1006 may be integrated, or the display 1004 and the content delivery device(s) 1008 may be integrated, for example.

The system 1000 may be implemented as a wireless system or a wired system. When implemented as a wireless system, the system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum. When implemented as a wired system, the system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, or the like. Examples of wired communications media may include a wire, cable, metal leads, printed circuit board (PCB), backplane, switch fabric, semiconductor material, twisted-pair wire, co-axial cable, fiber optics, or the like.

The platform 1002 may establish one or more logical or physical channels to communicate information. The information may include media information and control information. Media information may refer to any data representing content meant for a user. Examples of content may include, for example, data from a voice conversation, videoconference, streaming video, electronic mail (email) message, voice mail message, alphanumeric symbols, graphics, image, video, text, and the like. Data from a voice conversation may be, for example, speech information, silence periods, background noise, comfort noise, tones, and the like. Control information may refer to any data representing commands, instructions or control words meant for an automated system. For example, control information may be used to route media information through a system, or instruct a node to process the media information in a predetermined manner. The embodiments, however, are not limited to the elements or the context shown or described in FIG. 10.

Figure 11:
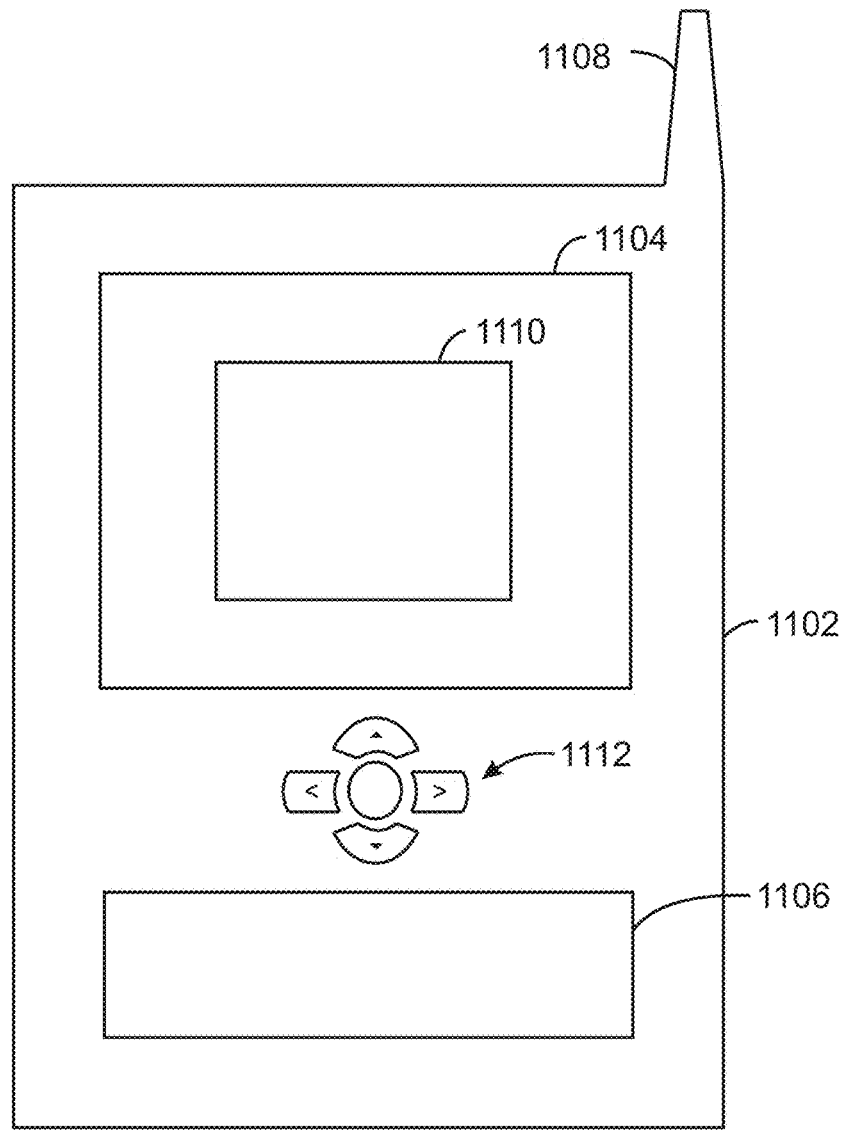
FIG. 11 is a schematic of a small form factor device in which the system of FIG. 10 may be embodied.

FIG. 11 is a schematic of a small form factor device 1100 in which the system 1000 of FIG. 10 may be embodied. Like numbered items are as described with respect to FIG. 10. In some embodiments, for example, the device 1100 is implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, server computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and the like.

An example of a mobile computing device may also include a computer that is arranged to be worn by a person, such as a wrist computer, finger computer, ring computer, eyeglass computer, belt-clip computer, arm-band computer, shoe computer, clothing computer, or any other suitable type of wearable computer. For example, the mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wired or wireless mobile computing devices as well.

As shown in FIG. 11, the device 1100 may include a housing 1102, a display 1104, an input/output (I/O) device 1106, and an antenna 1108. The device 1100 may also include navigation features 1112. The display 1104 may include any suitable display 1110 unit for displaying information appropriate for a mobile computing device. The I/O device 1106 may include any suitable I/O device for entering information into a mobile computing device. For example, the I/O device 1106 may include an alphanumeric keyboard, a numeric keypad, a touch pad, input keys, buttons, switches, rocker switches, microphones, speakers, a voice recognition device and software, or the like. Information may also be entered into the device by way of microphone. Such information may be digitized by a voice recognition device.

Example 1

A method for angle dependent anisotropic filtering is described herein. The method includes computing an anisotropic filter with a major-axis and a minor-axis of a texture map for a pixel to be displayed on screen-space and modifying the length of a major-axis of the anisotropic filter based on a screen space angle. The method also includes determining a number of texels from the texture map that are to be sampled in the anisotropic filter based on the length of the modified major-axis, and determining a color of the pixel based on the texels sampled in the anisotropic filter.

A distortion from the pixel may be below a threshold. The length of the major axis of the anisotropic filter may be modified to decrease from the original computed length as the angle approaches 45°. Additionally, the length of the minor axis of the anisotropic filter may be held constant independently of the angle. Further, the length of the major axis may vary based on the position of the anisotropic major axis with respect to the screen-space axes. The texels may be sampled using a computed effective sampling interval. Further, the moiré in a rendered image at all screen space angle values may be equal.

Example 2

A graphics processing unit is described herein. The graphics processing unit includes at least one bilinear low pass filter, wherein the bilinear low pass filter is configured to filter data for a first MIP map and a second MIP map, where data from each MIP map represents a two by two group of texels, wherein the two by two group of texels is nearest to a desired position on the first MIP map and the second MIP map, respectively. The graphics processing unit also includes at least one anisotropic low pass filter, wherein the anisotropic low pass filter is configured to adaptively filter sampled data from the bilinear low pass filter for the first MIP map and the second MIP map, and a length of a major-axis of the anisotropic low pass filter is varied based on a screen space angle. Moreover, the graphics processing unit includes at least one sampler unit, wherein the sampler unit is configured to sample the output of the bilinear low pass filter and the anisotropic low pass filter.

The results of the anisotropic sampling on the first MIP map and the second MIP map may be combined as a weighted sum based on a fractional part. An effective number of ways may be computed for each of the first MIP map and the second MIP map, and each of the first MIP map and the second MIP map is sampled based on the effective number of ways after applying a bilinear filter. A width of the anisotropic low pass filter for each of the first MIP map and the second MIP map may be twice the anisotropic ratio for that MIP. Additionally, the anisotropic low pass filter shape may pass a minimum of higher frequency components beyond an ideal sampling cut-off frequency and a maximum of lower frequency components within the ideal sampling cut-off frequency. The first MIP map and the second MIP map may be filtered by the bilinear low pass filter and then sampled at a one-texel interval on each of the first MIP map and the second MIP map.

Example 3

A system for anisotropic filtering is described herein. The system includes a central processing unit (CPU), a graphical processing unit (GPU) coupled to the CPU. The GPU is configured to compute an anisotropic filter with a major-axis and a minor-axis for a pixel to be displayed on screen-space, where the anisotropic filter is to be applied to corresponding MIPs on a texture map, and vary the length of the major-axis of the anisotropic filter based on the angle of the major-axis with respect to the screen-space axes. The GPU is also configured to determine a number of texels from the texture map that are to be sampled in the anisotropic filter based on the length of the modified major-axis, and determine the color of the pixel based on the texels sampled in the anisotropic filter.

A display screen may display the pixel on the screen space. A memory drive may store information corresponding to the texture. Additionally, the angle may be measured between the major-axis of anisotropy and an axis of the screen-space. Further, the length of the major axis of the anisotropic filter may be modified to decrease from the original computed length as the angle approaches 45°. Additionally, the length of the minor axis of the anisotropic filter may be held constant independently of the angle.

Example 4

A tangible, non-transitory computer-readable medium for angle dependent anisotropic filtering, comprising instructions configured to direct a processor to vary the length of a major-axis of the anisotropic filter based on a screen space angle and determine a number of texels from the texture map that are to be sampled in the anisotropic filter based on the length of the modified major-axis. The instructions may also direct the processor to compute an anisotropic filter with a major-axis and a minor-axis of a texture map for a pixel to be displayed on screen-space, and determine a color of the pixel based on the texels sampled in the anisotropic filter. The length of the major axis of the anisotropic filter may be modified to decrease from the original computed length as the angle approaches 45°.

Although some embodiments have been described in reference to particular implementations, other implementations are possible according to some embodiments. Additionally, the arrangement and order of circuit elements or other features illustrated in the drawings or described herein need not be arranged in the particular way illustrated and described. Many other arrangements are possible according to some embodiments.

In each system shown in a figure, the elements in some cases may each have a same reference number or a different reference number to suggest that the elements represented could be different or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the present techniques. Reference in the specification to "an embodiment," "one embodiment," "some embodiments," or "other embodiments" means that a particular feature, structure, or characteristic described in connection with the embodiments is included in at least some embodiments, but not necessarily all embodiments, of the present techniques. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although flow diagrams and state diagrams may have been used herein to describe embodiments, the present techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A graphics processing unit for angle dependent anisotropic filtering, the graphics processing unit is coupled to a central processing unit and a storage device, the graphics processing unit comprising:
   at least one bilinear low pass filter, wherein the bilinear low pass filter is configured to filter data for a first MIP map and a second MIP map, where data from each MIP map represents a two by two group of texels, wherein the two by two group of texels is nearest to a desired position on the first MIP map and the second MIP map, respectively;
   at least one anisotropic low pass filter, wherein the anisotropic low pass filter is configured to adaptively filter sampled data from the bilinear low pass filter for the first MIP map and the second MIP map, and a length of a major-axis of the anisotropic low pass filter is varied based on a screen space angle;
   at least one sampler unit, wherein the sampler unit is configured to sample the output of the bilinear low pass filter and the anisotropic low pass filter, wherein the at least one sampler unit includes a texture sampling component to determine texels from a texture map that are to be sampled in the anisotropic low pass filter based on length of a modified major-axis; and
   a pixel coloration component to determine a color of a pixel based on the texels sampled in the anisotropic low pass filter, wherein the pixel is displayed on a screen-space.

2. The graphics processing unit of claim 1, wherein the results of the anisotropic sampling on the first MIP map and the second MIP map are combined as a weighted sum based on a fractional part.

3. The graphics processing unit of claim 1, wherein a width of the anisotropic low pass filter for each of the first MIP map and the second MIP map is twice the anisotropic ratio for that MIP.

4. The graphics processing unit of claim 1, wherein the anisotropic low pass filter shape passes a minimum of higher frequency components beyond an ideal sampling cut-off frequency and a maximum of lower frequency components within the ideal sampling cut-off frequency.

5. The graphics processing unit of claim 1, wherein the first MIP and the second MIP are filtered by the bilinear low pass filter and then sampled at a one-texel interval on each of the first MIP map and the second MIP map.

* * * * *